United States Patent

[11] 3,586,909

| [72] | Inventors | Thor Erik Thorsteinsen;<br>Valter Larsson, both of Vasteras, Sweden |
|---|---|---|
| [21] | Appl. No. | 819,780 |
| [22] | Filed | Apr. 28, 1969 |
| [45] | Patented | June 22, 1971 |
| [73] | Assignee | Allmanna Svenska Elekriska Aktiebolaget<br>Vasteras, Sweden |
| [32] | Priority | Dec. 29, 1967 |
| [33] | | Sweden |
| [31] | | 17974/67 |
| | | Continuation-in-part of application Ser. No.<br>781,344, Dec. 5, 1968. |

[54] PROTECTING MEANS FOR SERIES CAPACITORS IN HIGH VOLTAGE ELECTRICAL CONDUCTORS
6 Claims, 5 Drawing Figs.

[52] U.S. Cl.................................................. 317/12,
317/23, 317/69
[51] Int. Cl.................................................. H02h 7/16
[50] Field of Search.......................................... 317/12,
12.1, 23, 69

[56] References Cited
UNITED STATES PATENTS
2,546,008  3/1951  Marbury et al. .............. 317/12.1
FOREIGN PATENTS
511,296  3/1955  Canada ........................ 317/12
928,185  4/1955  Germany...................... 317/69

Primary Examiner—J. D. Miller
Assistant Examiner—Harry E. Moose, Jr.
Attorney—Jennings Bailey, Jr.

ABSTRACT: For protecting series capacitors in high voltage electrical conductors, two circuits are provided in parallel with the capacitor, each containing a spark gap and a switch. A third switch constituted by a breaker can short circuit the capacitor. A control device is provided which, when one of the spark gaps ignites, closes the breaker, and thereafter opens the switch in the circuit of the ignited spark gap. When the fault ceases, the breaker opens and, shortly thereafter, the opened switch is reclosed.

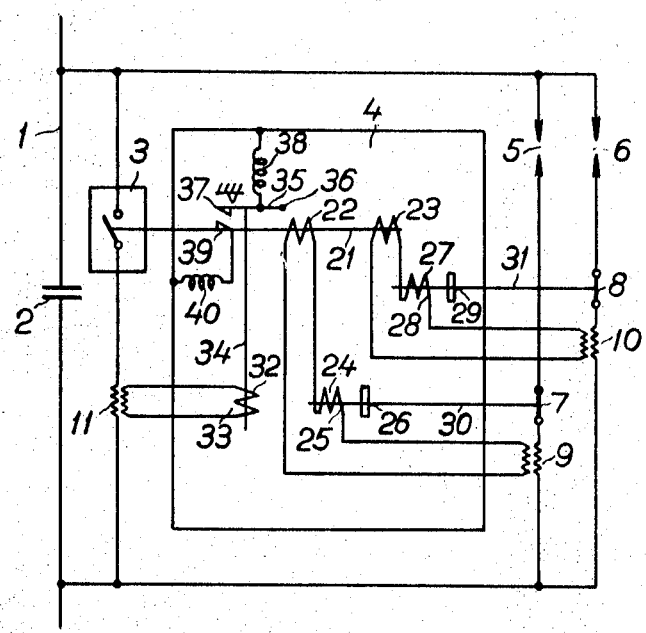

3,586,909

PROTECTING MEANS FOR SERIES CAPACITORS IN HIGH VOLTAGE ELECTRICAL CONDUCTORS

PRIOR APPLICATIONS

This application is a continuation-in-part of application Ser. No. 781,344, filed Dec. 5, 1968.

BACKGROUND OF THE INVENTION

Field of the Invention

The present invention relates to a means for protecting series capacitors in high voltage electrical conductors where the short circuit current is high and where recovery strength is desired.

SUMMARY OF THE DISCLOSURE

The invention is characterized by at least two circuit, each consisting of a spark gap and a switching device connected in parallel with the capacitor, yet another switching device to short circuit the capacitor and a control device influenced by the current through said circuits, to control the switching devices.

BRIEF DESCRIPTION OF THE DRAWINGS

Four different embodiments of the invention are shown in FIGS. 1 to 4 of the accompanying drawings, while FIG. 5 shows the control device in detail.

DESCRIPTION OF THE PREFERRED EMBODIMENTS

Figure 1:
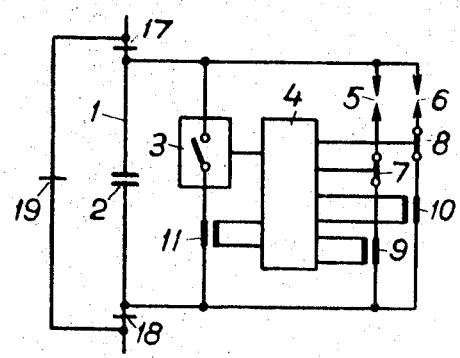

In all the figures the series capacitor to be protected which is connected in the conductor 1 is designated 2. In FIG. 1 a switching device 3 is connected in parallel wit the capacitor which suitably consists of a breaker which is normally open. The opening and closing movements of the switching device are controlled by a control device 4. Parallel to the capacitor 2 are also two spark gap circuits, each comprising a spark gap 5 and 6, respectively, and a switching device 7 and 8, respectively, controlled by control device 4. The spark gap circuit 5, 7 also includes the primary winding of a current transformer 9, the secondary winding of which is connected to the control device 4. In the same way the spark gap circuit 6, 8 includes a current transformer 10, the secondary winding of which is connected to the control device. A third current transformer 11 is inserted in the circuit of the switching device 3 in order to be responsive to the line current after this switching device has operated and has short-circuited the capacitor and to emit an opening impulse to the switching devices 7 and 8 when the line current has been reduced to a predetermined value. In practice they will consist of fully insulated current transformers in the line.

Figure 2:
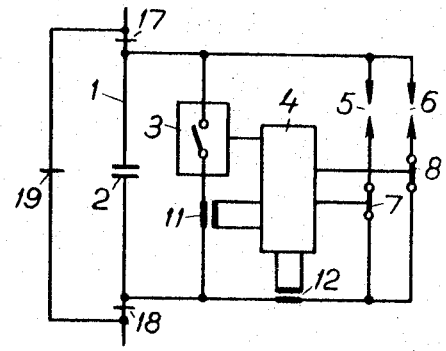

The embodiment according to FIG. 2 agrees substantially with that in FIG. 1, but has a current transformer 12 which is common for both spark gaps and is inserted in the common conductor to the spark gaps.

Figure 3:
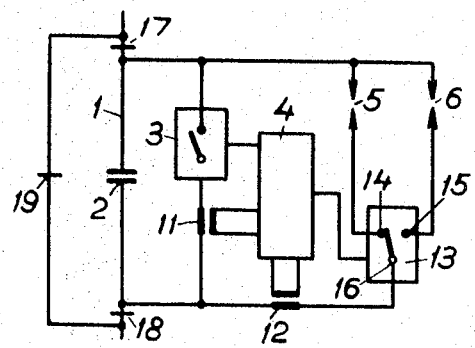

FIG. 3 shows a variation of the invention with a current transformer 12 common for both spark gaps, but where the switching device is also common for both spark gap circuits. The switching device here consists of two-position switch 13 having two stationary contacts 14 and 15, the contact 14 being connected to the spark gap 5 and the contact 15 to the spark gap 6. The movable contact 16 is connected to the lower side of the capacitor.

Figure 4:
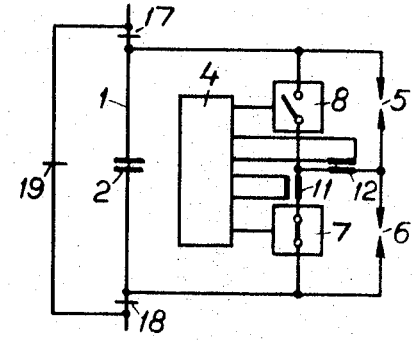

A fourth variation of the invention is shown in FIG. 4. Here the two spark gap circuits 5, 7 and 6, 8 respectively, are arranged crosswise with a common conductor in which the current transformer 12 is arranged. The previously shown current transformer 11 is here inserted in the spark gap circuit consisting of the spark gap 5 and switching device 7. The two switching devices 7 and 8 also act as switching devices to short circuit the capacitor.

In order to be able to disconnect the capacitor 2, two isolators 17, 18 are inserted in the line 1 and a third isolator 19 is connected in parallel over the capacitor and the two first-mentioned isolators.

In the embodiment according to FIG. 1 the two spark gaps have as nearly as possible the same ignition voltage. Both the switching devices 7 and 8 are closed. The switching devices may be of the isolator type since they do not need to break any great power. It is, however, possible to make one spark gap, for example 5, with somewhat lower ignition voltage so that it always ignites first when an overvoltage arises. In that case 7 is closed and 8 may be open or closed.

When an overvoltage arises one of the gaps 5 or 6 ignites. The corresponding current transformer emits an impulse to the control device 4 which sends a closing impulse to the switching device 3 which is a normal breaker since it must be able to break the line current. When the switching device 3 has short-circuited the capacitor the switching device is open in the spark gap circuit which supplied current. When the fault ceases the switching device 3 opens and the capacitor is connected in the conductor. Some seconds later, when the spark gap which ignited has been de-ionized the switching device closes again and both gaps are ready. In the meanwhile the second gap has been prepared with its switching device 8 in closed position.

In the embodiments of the invention shown in FIGS. 2, 3 and 4 one of the spark gaps, for example 5, may have priority so that it always ignites first when an overvoltage arises. It is thus possible to use only one current transformer 12 since the secondary current from the current transformer indicates that the spark gap 5 has ignited. The switching process for the arrangement according to FIG. 2 is otherwise the same as for the arrangement shown in FIG. 1.

Also in the embodiment according to FIG. 3 the spark gap 5 may have priority. The switch 13 is in the position shown in the FIG. Upon an overvoltage the switch 13 receives an impulse to move into its other position as soon as the switching device 3 has short-circuited the capacitor. Thus the property operating gap 6 will be available until the gap 5 is de-ionized and reconnected.

FIG. 4 shows an arrangement when the switching device in the spark gap circuits can also be used to short circuit the capacitor as with the switching device 3 in the previously described embodiments. In this case the gap 5 may have priority and the switching device 7 be in closed position. Upon an overvoltage the gap 5 ignites and the current from the current transformer 12 causes the control device to emit a closing impulse to the switching device 8 so that the capacitor 2 is short-circuited. When the fault ceases and the current has regained its normal value the device 7 receives an impulse to break. The capacitor is thus connected in on the line and the properly operating gap 6 is prepared if the fault should return before the gap 5 has had time to be de-ionized. After the time necessary for this, the device 8 closes and the device 7 opens so that the arrangement has returned to its shown position. Since the devices 7 and 8 must break the line current, breakers are required as switching devices.

FIG. 5 shows in detail the control device. The switching device 3 is controlled by a control rod 21 and two coils 22 and 23 which work as relay coils, thereby pulling the rod 21 as a relay armature. The coil 22 is series-connected with a coil 24 in a relay 25 with delayed pickup and dropout which is indicated by the rectangle 26. The two coils 22 and 24 are connected to the secondary coil of the current transformer 9. In the same manner the coil 23 is series-connected with a coil 27 in a relay 28 with delayed pickup and dropout indicated by the rectangle 29. The coils 23 and 27 are connected to the secondary coil of the current transformer 10. The relay 28 operates the switching device 8 by the rod 31.

The secondary coil of the current transformer 11 is connected to the coil 32 of a relay 33 and this relay is arranged to operate a lever 35 by the aid of a rod 34. The lever 35 is journaled as a point 36. The free end of the lever is provided with a hook 37 and the lever is secured in the position shown by a tension spring 38. The rod 21 is provided with a hook 39, which cooperates with hook 37 when relay 33 is energized and the switch 3 is closed. The strength of the spring 38 is so great that, with normal line current through the current transformer 11, it is greater than the tractive force of the relay 33 on the lever 35. This means that the switching device 3 can be kept in closed position by the lever 35 and the hooks 37 and 39 only if the current through the current transformer 11 exceeds the normal line current by a certain value, which depends upon the pull force of the spring 38. When there is no current through the coils 22 or 23, the rod 21 is pulled to the left by a spring 40 and the switching device 3 is held open.

When an overvoltage occurs across the capacitor 2, one of the gaps 5 or 6 sparks over. If, for example, the gap 5 sparks over, current transformer 9 gives an exciting impulse to relay 25 and exciting current to the coil 22. The switching device 3 will close immediately and short circuit the capacitor, whereupon the gap 5 is deenergized. The relay 25 opens the switching device 7 after the delay period, when it is certain that the switching device 3 is closed. When the switching device 3 is closed the line current goes through it and through the current transformer 11, whereby the relay 33 is energized by a greater than normal current and pulls down the lever 35. The hook 37 cooperates with the hook 39 and keeps the switching device 3 closed until the line current returns to its normal value. When this condition is reached, the force of the spring 38 preponderates over the relay 32, whereby the lever 35 is pulled upwards and the hooks 37 and 39 release their contact. Because of the spring 40, the switching device 3 opens and the capacitor resumes its normal operation.

When the relay 25 has opened the switching device 7 after the delay time and when the gap 5 is extinguished, the current through the coils 22 and 24 disappears and the relay 24 closes the device 7 after the delay time. During all this time, the gap 6 has been ready with its switching device 8 closed if the overvoltage surge be so short that the device 3 has closed before the device 7.

The arrangement with two alternating spark gaps means that a completely de-ionized properly operating gap which is always connected with the capacitor is connected to the line so that the protection can operate even before the spark gap which ignited upon the occurrence of a fault has had time to be completely de-ionized and attained substantially full ignition voltage.

We claim:

1. Means for protecting series capacitors in high voltage electrical conductors, comprising at least two circuits, each comprising a series connection of a spark gap 5,6 and a switching device 7, 8 connected in parallel with the capacitor 2, a further switching device 3 to short circuit the capacitor and a control device 4 responsive to the current through either of said circuits to control the switching devices 3, 7, 8, said control device including means responsive to current flow in one of said circuits to close said further switching device and to open the switching device in said circuit, and means responsive to excess flow of current through said further switching device to hold said further switching device closed as long as the current there through exceeds a predetermined excess over the normal current.

2. Means according to claim 1, in which each of the two circuits contains a current transformer 9, 10, the secondary winding of which is connected to the control device 4.

3. Means according to claim 1, in which a current transformer 12 is connected in a conductor which is common for both the spark gap circuits 4. Means according to claim 3, in which one of the spark gaps 5 has a slightly narrower sparking path so that it always ignites first.

5. Means according to claim 1, in which the switching device for the spark gap circuits is a two-position switch 13 common to both circuits.

6. Means for protecting series capacitors in high voltage electrical conductors, comprising at least two circuits, each circuit comprising a series connection of a spark gap 5, 6 and a switching device 7, 8, connected in parallel with the capacitor 2, a control device 4 responsive to the current through said circuits to control the two switching devices, said control device including means responsive to current flow in one of said circuits to hold one of said switching devices open as long as the current through the capacitor is below a predetermined value and to hold both switching devices closed as long as the current through the switching devices exceeds as predetermined excess over the normal current.